United States Patent
Wang et al.

(10) Patent No.: US 11,822,961 B2
(45) Date of Patent: Nov. 21, 2023

(54) METHOD AND APPARATUS FOR DATA PROCESSING, SERVER AND STORAGE MEDIUM

(71) Applicant: BEIJING XIAOMI MOBILE SOFTWARE CO., LTD., Beijing (CN)

(72) Inventors: Fuye Wang, Beijing (CN); Xiaobing Mao, Beijing (CN); Zenghui Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 378 days.

(21) Appl. No.: 17/214,121

(22) Filed: Mar. 26, 2021

(65) Prior Publication Data
US 2022/0035666 A1 Feb. 3, 2022

(30) Foreign Application Priority Data
Jul. 31, 2020 (CN) .......................... 202010763403.7

(51) Int. Cl.
*G06F 9/48* (2006.01)
*G06F 13/16* (2006.01)

(52) U.S. Cl.
CPC ........ *G06F 9/4887* (2013.01); *G06F 13/1668* (2013.01)

(58) Field of Classification Search
CPC ............................ G06F 9/4887; G06F 13/1668
See application file for complete search history.

(56) References Cited

U.S. PATENT DOCUMENTS

| | | | | |
|---|---|---|---|---|
| 5,640,563 | A * | 6/1997 | Carmon | G06F 9/4887 718/102 |
| 6,360,219 | B1 * | 3/2002 | Bretl | G06F 9/526 |
| 9,990,379 | B2 * | 6/2018 | Zhu | G06F 16/13 |
| 11,102,139 | B1 * | 8/2021 | Deng | H04L 67/562 |
| 11,218,419 | B1 * | 1/2022 | Sharifi Mehr | H04L 47/70 |
| 2003/0040820 | A1 * | 2/2003 | Staver | G05B 19/042 700/89 |
| 2003/0099254 | A1 * | 5/2003 | Richter | H04L 67/1097 370/352 |
| 2007/0174511 | A1 * | 7/2007 | Yu | G06F 13/28 710/36 |
| 2017/0168879 | A1 | 6/2017 | Dann | |
| 2018/0165138 | A1 | 6/2018 | Rao | |

OTHER PUBLICATIONS

"Several traditional Java standalone task scheduling method", https://www.cnblogs.com/yadongliang/p/9226661.html, from: https://www.ibm.com/developerworks/cn/java/j-lo-taskschedule/. (14 pages).

(Continued)

*Primary Examiner* — Emerson C Puente
*Assistant Examiner* — Jonathan R Labud
(74) *Attorney, Agent, or Firm* — Arch & Lake LLP (57) ABSTRACT

A method includes that: a user event to be processed is received; the user event to be processed is stored into an event queue corresponding to an event attribute of the user event to be processed, user events with different event attributes corresponding to different event queues; the user event is read from the event queue through multiple processes and is processed; and the processed user event is deleted from the event queue.

18 Claims, 6 Drawing Sheets

(56) References Cited

OTHER PUBLICATIONS

"Hashed and Hierarchical Timing Wheels: Efficient Data Structures for Implementing a Timer Facility", George Varghese, Tony Lauck, Feb. 14, 1996, http://cseweb.ucsd.edu/users/varghese/PAPERS/twheel.ps.Z. (24 pages).

"Introduction to Redis", Redis is a distributed cache system, supports sorting collection and other advanced data structure, https://redis.io/. (1 page).

European Search Report in the European application No. 21165580.8, dated Sep. 20, 2021. (10 pages).

* cited by examiner

METHOD AND APPARATUS FOR DATA PROCESSING, SERVER AND STORAGE MEDIUM

CROSS-REFERENCE TO RELATED APPLICATION

This application claims the priority to Chinese Patent Application No. 202010763403.7, filed on Jul. 31, 2020, the contents of which are incorporated herein by reference in their entirety for all purposes.

TECHNICAL FIELD

The present disclosure relates to the technical field of data processing, and more particularly, to a method and apparatus for data processing, a server and a storage medium.

BACKGROUND

With the development of Internet communications, scales of Internet systems become increasingly large, the number of user tasks is ever-growing and the tasks also become more and more complex. Particularly in a distributed environment, there are multiple service systems, and each service system has a requirement on user tasks. When all user tasks are scheduled in their respective systems, the complexity of the service systems is increased on one hand, and the management is inconvenient on the other hand. Hence, there is a need for a task platform that can manage and schedule dispersive tasks uniformly.

SUMMARY

The present disclosure provides a method and apparatus for data processing, a server and a storage medium.

According to a first aspect of the examples of the present disclosure, a method for data processing is provided, which may include:

receiving a user event to be processed;

storing the user event to be processed into an event queue corresponding to an event attribute of the user event to be processed, wherein user events with different event attributes correspond to different event queues;

reading the user event from the event queue through multiple processes and processing the user event; and deleting the processed user event from the event queue.

According to a second aspect of the examples of the present disclosure, an apparatus for data processing a server is provided.

The apparatus may include a network interface, configured to receive a user event to be processed; a memory, configured to store the user event to be processed into an event queue corresponding to an event attribute of the user event to be processed, where user events with different event attributes correspond to different event queues; and a processing component, connected to the network interface and the memory, configured to read the user event from the event queue through multiple processes and process the user event; and delete the processed user event from the event queue.

According to a third aspect of the examples of the present disclosure, a storage medium is provided, which stores instructions that, when executed by a processor of a server, cause the server to implement receiving a user event to be processed; storing the user event to be processed into an event queue corresponding to an event attribute of the user event to be processed, where user events with different event attributes correspond to different event queues; reading the user event from the event queue through multiple processes and processing the user event; and deleting the processed user event from the event queue.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure.

Figure 1:
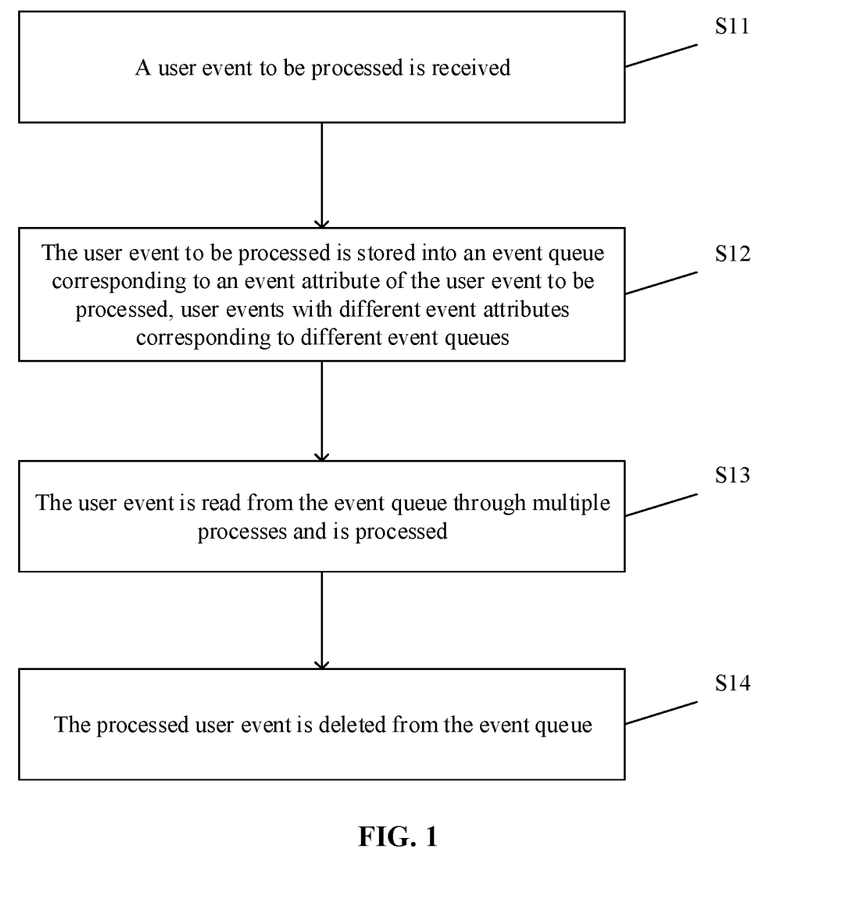
FIG. 1 is a flowchart of a method for data processing according to an example.

FIG. 1 is a flowchart of a method for data processing according to an example. As shown in FIG. 1, the method for data processing may include the following operations.

In S11, a user event to be processed is received.

In S12, the user event to be processed is stored into an event queue corresponding to an event attribute of the user event to be processed, user events with different event attributes corresponding to different event queues.

In S13, the user event is read from the event queue through multiple processes and is processed.

In S14, the processed user event is deleted from the event queue.

In the example of the present disclosure, the method for data processing is implemented by an apparatus for data processing. The apparatus for data processing may be a server platform. The server platform may adopt to receive a user event to be processed and process the user event. The distributed architecture may be a server cluster.

Based on the server platform of the present disclosure, the user event pushed by a server supporting each third-party application may be accessed. For example, the third-party applications may be those applications from cooperative service providers, such as Taobao applications, Meituan applications, mail applications or notebook applications or the like.

In the example of the present disclosure, user events may include at least one of the followings:
an event to be processed, which is triggered by a user operation; and
an event to be processed, which prompts a user of executing a preset operation.

For example, a user event may be an order event which is an order that is generated based on a shopping action of a user and is to be paid.

For another example, a user event may be a schedule reminding event or a conference event which is set based on a user's schedule.

Figure 2:
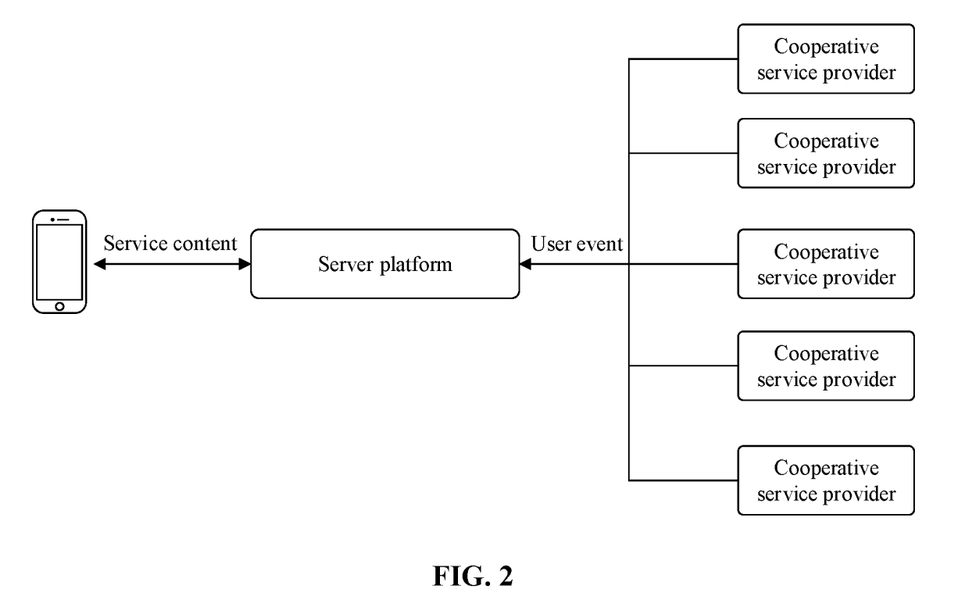
FIG. 2 is an architecture diagram of a server platform according to an example.

FIG. 2 is an architecture diagram of a server platform according to an example. As shown in FIG. 2, different cooperative service providers can be accessed on the server platform, user events pushed by each cooperative service provider can be pushed to the server platform, and the server platform can process the user events and send a processing result to a mobile phone of a user. For example, messages may be displayed on a secondary screen of a mobile phone of a user, and a sorting result of the messages may be a result after the server platform sorts user events.

In operation S11, the user event to be processed by the server platform may be received by any server on the server platform. The any server may be a master server, and each subserver on the server platform may work based on an instruction of the master server.

As the user events received by the server platform may be from different cooperative service providers and different users, a data volume of the user events may be very large. A great number of user events, however, cannot be processed immediately. Hence, there is a need for increased memory for storing the received user events, so as to balance a capability of receiving the user events and a capability of processing the user events.

In operation S12, the server platform stores the user event to be processed into the event queue. During storage, user events with different event attributes are stored into different event queues based on the event attributes of the user events to be processed. The event attributes of the user event may include at least one of the followings:
a user identifier corresponding to the user event;
an event type of the user event; and
time information of the user event.

In an example, the event attribute may include a user identifier indicating a user to which the user event belongs; and user events with different user identifiers correspond to different event queues.

In an example, the operation that the user event to be processed is stored into the event queue corresponding to the event attribute of the user event to be processed may include that:
the user identifier of the user event to be processed is processed through a consistent hashing algorithm to obtain a hash value; and
the user event to be processed is stored into the event queue corresponding to the hash value.

In the example, the user identifier of the user event to be processed may be processed through the consistent hashing algorithm to obtain the hash value, and the user event to be processed is stored into the event queue corresponding to the hash value. In this way, there is no need to compare the user identifier of the user event with the user identifier of each event queue one by one, but just the user event is stored into the event queue corresponding to the hash value based on the calculated hash value. For example, the calculated hash value is 2, and the user event is stored into the second event queue.

It may be understood that based on the consistent hashing algorithm, the present disclosure can quickly store a user event into a corresponding event queue, so that the performance of the server platform is improved.

In an example, user events may be stored into different event queues based on types of the user events. For example, an express event may be stored into an event queue, a take-out order may be stored into an event queue, and a Taobao order may be stored into another event queue, etc.

In an example, user events may be stored into different event queues based on time information of the user events. For example, user events received within a preset time difference range may be stored into a same event queue, and user events having a large difference in receiving time may be stored into different event queues. The time information of the user event may further include time information contained in the user event beside the receiving time of the user event. For example, the user event is to remind the user of taking an express at 4 p.m., and the 4 p.m. today belongs to the time information contained in the user event. In addition, the time information of the user event may further include prompt time of the server platform. For example, it is agreed that the server platform gives a prompt a predetermined duration (such as ten minutes) early based on the time information contained in the user event.

It is to be noted that when the user event to be processed is stored into the event queue, a Remote Dictionary Server (Redis) database may be used, and a group of ordered structured Redis Zset are initially allocated as the event queue. As the Redis supports master-slave synchronization and data may be synchronized from the master server to any number of slave servers, the user event may be backed up based on the Redis to reduce the probability of data loss due to damage of the server.

In operations S13 to S14, the server platform reads the user event from the event queue through the multiple processes and processes the user event, and deletes the processed user event. Different processes may be used to process user events from different event queues, and may also be used to process different user events from a same event queue.

In the example of the present disclosure, one process may correspond to one piece of memory in one server, and each piece of memory in the server may read user events in different event queues for processing. In addition, one process may further correspond to one server, i.e., the server platform may process user events in each event queue through different servers.

In the present disclosure, a received user event may be cached to an event queue and the user event may be taken from the event queue and then is processed. This is called a producer-consumer mode. The operation of submitting a task is equivalent to the producer, and the operation of executing the task is equivalent to the consumer. For example, during the double 11 shopping carnival, a process or server receiving orders from Taobao acts as the producer, and a process or server processing the orders is equivalent to the consumer. In the producer-consumer mode in the present disclosure, the user events to be processed are stored into different event queues based on the attributes of the user events.

Figure 3:
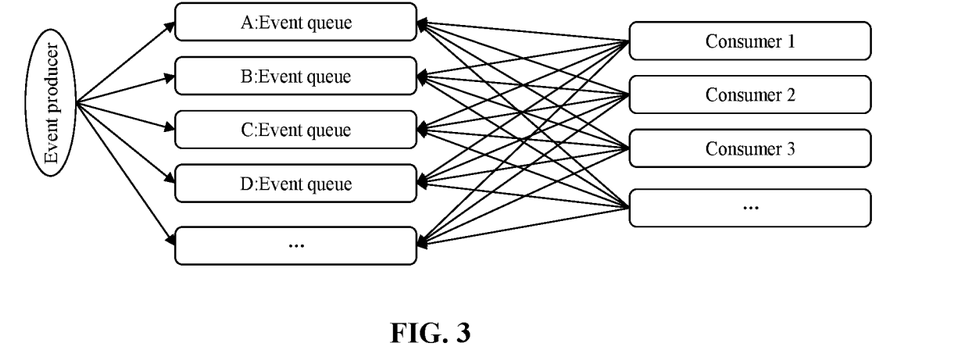
FIG. 3 is a structural example diagram of user event scheduling according to an example.

FIG. 3 is a structural example diagram of user event scheduling according to an example. As shown in FIG. 3, user events generated by an event producer are stored into different event queues, and different consumers take the user events from the event queues and process the user events. Different user events in the same event queue may be processed by different consumers, and different consumers may also process events from different event queues.

In an example, a user event to be processed may be scheduled by a Java-based conventional stand-alone task scheduling method (such as Timer), or the user event to be processed may also be scheduled based on a time wheel scheduling algorithm. However, the conventional stand-alone task scheduling method based on Java may cause large performance consumption and does not support a distributed mode. The scheduling algorithm based on the time wheel does also not support the distributed mode either and may result in belated scheduling.

In view of this, in the present disclosure, with the use of a distributed processing architecture, user events with different event attributes are stored into different event queues, and the user events are read from the event queues through multiple processes for processing, i.e., a distributed storage and distributed processing mode is used. On one hand, based on the distributed storage, the user events are dispersed to different event queues, therefore, compared with a mode in which all user events are stored in one event queue, the operations (reading, sorting and the like) for the user events in each event queue can improve the speed of operating the user events. In addition, when an event queue is abnormal, the user events in rest event queues may still be executed, i.e., abnormal scheduling caused by a single-point fault of data can be reduced for the whole user event scheduling. On the other hand, based on the distributed processing, i.e., different user events are processed through multiple processes, the speed of scheduling each user event can be improved, and when one process is damaged, the user events may still be processed by rest processes. It may be understood that in combination with the distributed storage and the distributed processing, the present disclosure can improve the speed of processing user events and can further improve the stability of the server platform.

In an example, the method may further include the following operations.

A priority of the user event in a same event queue is determined.

A position of the user event in the same event queue is adjusted according to the priority.

The user event enters the same event queue from a tail of the same event queue, and is taken out by the multiple processes from a head of the same event queue.

In the example, the user event in the same event queue may be dynamically sorted, i.e., the position of the user event in the same event queue may be adjusted according to the priority. For example, the priority may be represented by a score, and the higher the score, the higher the priority.

A queue is a linear table and allows for a deletion operation (deleting after reading a user event for processing) at the front end of the table and an insertion operation (inserting a user event) at the rear end of the table, therefore, a sequential order for processing user events in an event queue can be dynamically adjusted by dynamically sorting priorities, so that the intelligence of the server platform is improved.

It is to be noted that, in the examples of the present disclosure, a priority of a user event may be determined based on an event attribute of the user event and a position of the user event in the event queue may be determined. For example, when a user identifier belongs to an important user, a user event associated with the user identifier may be set with a higher priority. For another example, when the user event is a conference reminding event, the conference reminding event may be set with a higher priority; or, when the user event is a clothes pick-up reminding event, and the clothes pick-up reminding event may be set with a higher priority when the server platform determines based on a weather application that the weather gets bad. In another example, a user event is a flight reminding event for reminding that the flight will take off at 10 p.m. today, and another user event is an express reminding event for reminding that the express will be delivered at 4 p.m. today, a priority of the express reminding event may be set to be higher than that of the flight reminding event.

In an example, the operation that the priority of the user event in the same event queue is determined may include the following operations.

Time information of the user event in the same event queue is acquired.

The priority of the user event in the same event queue is determined based on time corresponding to the time information. The priority is positively correlated with the time corresponding to the time information of the user event.

As described above, the priority of the user event may be determined based on the event attribute of the user event. In the example, the priority of the user event is determined based on the time information of the user event. The earlier the time is, the higher the priority of the user event is. The time information of the user event may refer to time information contained in the user event, such as event information in the above described express reminding event and flight reminding event.

In the example of the present disclosure, the server platform may make intelligent analysis on the user event, and extract the time information contained in the user event. When the priority of the user event is sorted based on the acquired time information, a jump-table sorting method may be used for sorting. When N (the N is greater than 1) user events are provided in the time queue, the average time complexity is not greater than log(N) based on the jump-table sorting method.

It may be understood that the time information included in the user event may reflect the sequential order that the event is executed, therefore, the present disclosure may set a higher priority for a user event that occurs earlier based on time information of the user event, such that an execution sequence of user events can be arranged reasonably and upgraded intelligence is achieved.

In an example, the operation that the user event is read from the event queue through the multiple processes and is then processed may include the following operations.

The user event is read from a head of one event queue through one process in the multiple processes, and whether trigger time for reading the user event is reached is determined.

The read user event is processed when the trigger time for reading the user event is reached.

In the example of the present disclosure, a user event may be read from the head of an event queue in each process, whether a trigger time for reading the user event is reached may be determined, and the read user event may be processed when the trigger time is reached. For example, the user event is a timing task, such as sending a consumption record table of a last month to a user at 10 a.m. on the 1st day of each month. After the process reads the user event at the head of the event queue, it may be determined that the trigger time of the user event is at 10 a.m. on the 1st day. When 10 a.m. on the 1st day comes, the server platform may send the consumption record table of the last month to the user.

In an example, the operation that the user event is read from the event queue through the multiple processes and is then processed may include that:

the user event is read from different event queues in a polling mode through the multiple processes and the user event is processed.

In the example, in order to enable user events in each event queue to be processed as much as possible, the user events are read from different event queues in the polling mode and are processed in the multiple processes.

For example, for five event queues sorted in a ABCDE sequence, when there are four processes, the four processes may process the user events in the event queues in sequences of ABCD, BCDE, CDEA, DEAB and EABC. The above sequences form one round. Upon the completion of processing of one round, a new round is re-started according to the sequences.

In an example, the method may further include that:
multiple event queues are randomly sorted.

The operation that the user event is read from the different event queues in the polling mode through the multiple processes and the user event is processed may include that:

the user event is read from the randomly sorted different event queues in the polling mode through the multiple processes and the user event is processed.

In the example, before the user event is read from the different event queues in the polling mode and processed, the event queues may be randomly sorted in advance such that each event queue can be processed as much as possible.

For example, the arrangement sequence of the event queues during initial polling is ABCDE, and the arrangement sequence of the event queues during next polling may be BCAED.

In the example of the present disclosure, a Shuffle function may be used to randomly sort the event queues.

In an example, the operation that the user event is read from the event queue through the multiple processes and is processed may include that:

the user event is read in a script call mode from the event queue through the multiple processes and is processed.

In the example of the present disclosure, when the user event is read from the event queue through the multiple processes and is processed, the executed program may be not interfered by other programs based on the script call mode. Hence, the script call mode can improve the atomicity of the program in execution, i.e., improve the stability of the process.

For example, when the Redis database is used, a Lua script call mode may be used. The sample code for Lua script call is as follows:

```
Local result =
redis.call('ZRANGEBYSCORE',
KEYS[1],ARGV[1],ARGV[2],"LIMIT",0,5)\n" +
   "for k, v in pairs(result) do\n" +
   " redis.call('ZREM',KEYS[1],v)\n" +
   "end\n" +
   "return result"
```

The ZRANGEBYSCORE instruction is acquiring a user event from the Zset structure based on a score, i.e., acquiring a user event according to a priority. KEYS[1] is the name of an event queue. ARGV[1] is a lower limit of the score. ARGV[2] is an upper limit of the score.

In an example, the method may further include that:
one or more event queues are added when a capacity expansion condition is met.

In the example of the present disclosure, one or more event queues may be added when the capacity expansion condition is met. Meeting the capacity expansion condition may be that the number of user events in the event queue is greater than a first number threshold.

In an example, when the number of user events in the event queue is greater than the first number threshold, one or more event queues may be added, and a part of user events in the event queue exceeding the first number threshold are stored into the newly added event queue. The multiple processes take the user event from different event queues including the newly added event queue and process the user event, so that implementing the capacity expansion can be implemented simply.

In another example, when the duration that the number of user events in the event queue is greater than the first number threshold exceeds a first duration threshold, one or more event queues are newly added. With the determination based on the duration, whether the capacity expansion is needed is determined so as to improve the necessity for capacity expansion and the stability of the server platform.

For example, when the Redis database is used, a Redis cluster node may be first added, and a new event queue is established; then, the consumer (process) is upgraded, i.e., the consumer is enabled to know the newly added queue (the new queue is empty at this time); and further, the producer is upgraded, i.e., the memory of the user event is upgraded, and the user event is re-allocated, such that the user event is written to the newly added event queue. After the user event is re-allocated, the user event may be processed by using different processes.

It is to be noted that the capacity expansion may occur in the working process of the server platform. During the capacity expansion, there may be a case where multiple user events of one user occur in different event queues and are processed by different processes. As the process may read and process the user event based on the time sequence, the probability that the sequence for processing the user event is wrong is relatively low. In a demanding transaction system (such as a bank transaction system), the capacity expansion of the platform may be accomplished by stopping the present work of the server platform.

In another example, the process may also be added when the capacity expansion condition is met. Meeting the capacity expansion condition may be that the time for reading the user event exceeds a first predetermined duration. When the time for reading the user event exceeds the first predetermined duration, the process may be added by adding the server to process the user event, and the process may also be added by the present server to process the user event.

It may be understood that, in the example of the present disclosure, the distributed processing architecture facilitates the dynamic expansion on the capacity of the server platform and has the characteristics of flexibility and good expansibility.

In an example, the method may further include that:
storing the user event into one or more event queues is forbidden when a capacity reduction condition is met; and
the event queue is deleted in response to the user event in the event queue being processed.

In the example of the present disclosure, storing the user event into one or more event queues is forbidden when the capacity reduction condition is met, and the event queue is deleted in response to the user event in the event queue being processed. Meeting the capacity reduction condition may be that the number of user events in the event queue is smaller than a second number threshold.

In an example, when the number of user events in the event queue is smaller than the second number threshold, storing the user event to the event queue may be forbidden.

In an example, when the duration that the number of user events in the event queue is smaller than the second number threshold exceeds a second duration threshold, storing the user event to the event queue is forbidden. It may be understood that whether the capacity reduction is needed may be determined based on the duration so as to improve the necessity for capacity reduction and the stability of the server platform.

For example, when the Redis database is used, it is first to upgrade the consumer such that the user event is not written to the target event queue with the number of user events smaller than the second number threshold, then to upgrade the consumer to not to read the target queue after the user event in the target queue is consumed completely (processed completely), and at last to delete the target event queue.

In another example, processes may also be reduced when the capacity reduction condition is met. Meeting the capacity reduction condition may be that the time for not reading a user event exceeds a second predetermined duration. When the time for reading a user event exceeds the second predetermined duration, processes may be reduced by reducing servers, and processes for processing the user event may also be reduced by closing a part of processes in the servers.

It is to be noted that both the capacity reduction condition and the capacity expansion condition in the present disclosure may also cause the capacity reduction and capacity expansion due to adjustment of hardware. For example, when the number of servers on the server platform is increased or memory of a server is expanded, the server platform may detect that the number of servers is increased or the memory is increased and thus the capacity expansion condition is met; and when the number of servers on the server platform is reduced or the memory of the server is reduced, the server platform may detect that the number of servers is reduced or the memory is reduced and thus the capacity reduction condition is met.

It may be understood that, in the example of the present disclosure, the distributed processing architecture facilitates the dynamic reduction on the capacity of the server platform and has the characteristics of flexibility and good expansibility.

Figure 4:
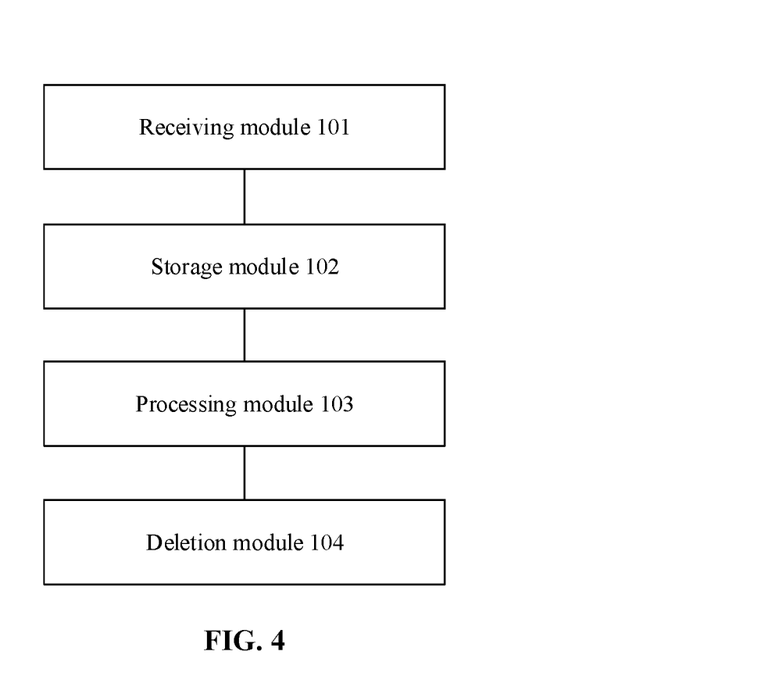
FIG. 4 is a diagram of an apparatus for data processing according to an example.

FIG. 4 is a diagram of an apparatus for data processing according to an example. Referring to FIG. 4, in an optional example, the apparatus may further include:
  a receiving module 101, configured to receive a user event to be processed;
  a storage module 102, configured to store the user event to be processed into an event queue corresponding to an event attribute of the user event to be processed, user events with different event attributes corresponding to different event queues;
  a processing module 103, configured to read the user event from the event queue through multiple processes and process the user event; and
  a deletion module 104, configured to delete the processed user event from the event queue.

Figure 5:
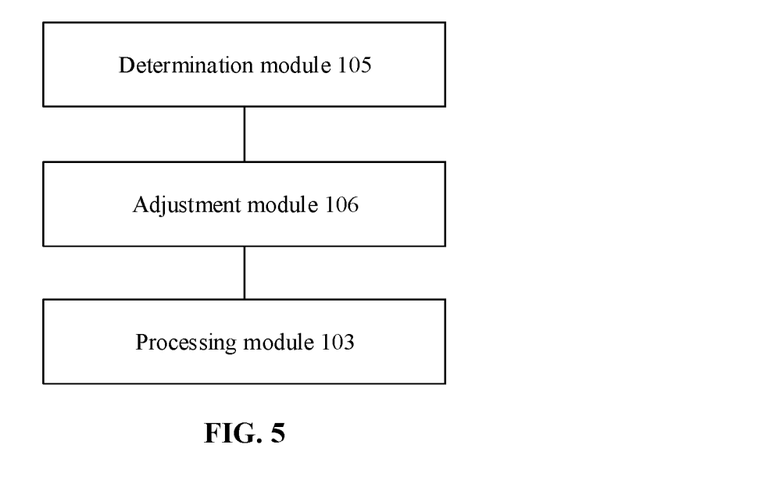
FIG. 5 is a diagram of the apparatus for data processing based on FIG. 4.

In some examples, as illustrated in FIG. 5, the apparatus may further include:
  a determination module 105, configured to determine a priority of the user event in a same event queue; and
  an adjustment module 106, configured to adjust a position of the user event in the same event queue according to the priority.

The user event enters the event queue from a tail of the event queue, and is taken out by the multiple processes from a head of the event queue.

In some examples, the determination module 105 is configured to acquire time information of the user event in the same event queue, and determine the priority of the user event in the same event queue based on time corresponding to the time information. The priority is positively correlated with the time corresponding to the time information of the user event.

In some examples, the processing module 103 is configured to read the user event from a head of an event queue through one process in the multiple processes, determine whether trigger time for reading the user event is reached, and process the read user event when the trigger time for reading the user event is reached.

In some examples, the processing module 103 is configured to read the user event from different event queues in a polling mode through the multiple processes and process the user event.

Figure 6:
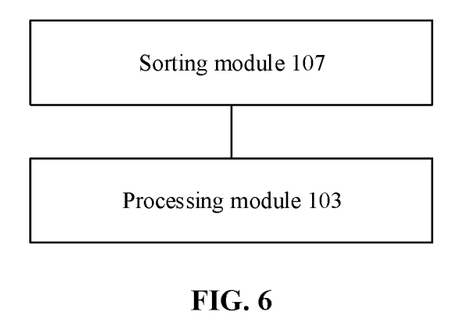
FIG. 6 is a diagram of the apparatus for data processing based on FIG. 4.

In some examples, as illustrated in FIG. 6, the apparatus may further include:
  a sorting module 107, configured to randomly sort the different event queues.

The processing module 103 is configured to read the user event from the randomly sorted different event queues in the polling mode through the multiple processes and process the user event.

In some examples, the event attribute may include a user identifier indicating a user to which the user event belongs; and user events with different user identifiers correspond to different event queues.

In some examples, the storage module 102 is configured to process the user identifier of the user event to be processed through a consistent hashing algorithm to obtain a hash value, and store the user event to be processed into the event queue corresponding to the hash value.

In some examples, the processing module 103 is configured to read, in a script call mode, the user event from the event queue through the multiple processes and process the user event.

Figure 7:
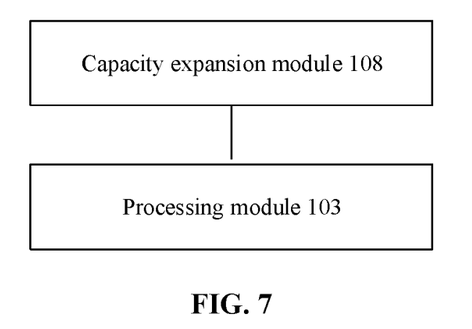
FIG. 7 is a diagram of the apparatus for data processing based on FIG. 4.

In some examples, as illustrated in FIG. 7, the apparatus may further include:
  a capacity expansion module 108, configured to add one or more event queues when a capacity expansion condition is met.

Figure 8:
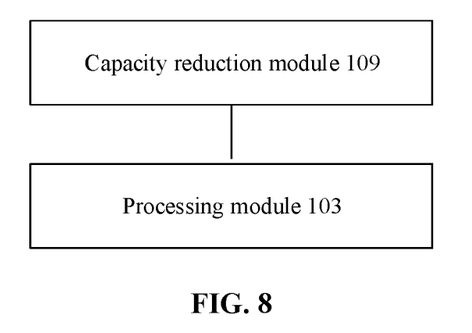
FIG. 8 is a diagram of the apparatus for data processing based on FIG. 4.

In some examples, as illustrated in FIG. 8, the apparatus may further include:
  a capacity reduction module 109, configured to forbid storing the user event into one or more event queues when a capacity reduction condition is met, and delete the event queue in response to the user event in the event queue being processed.

For the apparatus in the above examples, the specific mode for the operation executed by each module has been described in detail in the examples related to the method, and is not elaborated herein.

Figure 9:
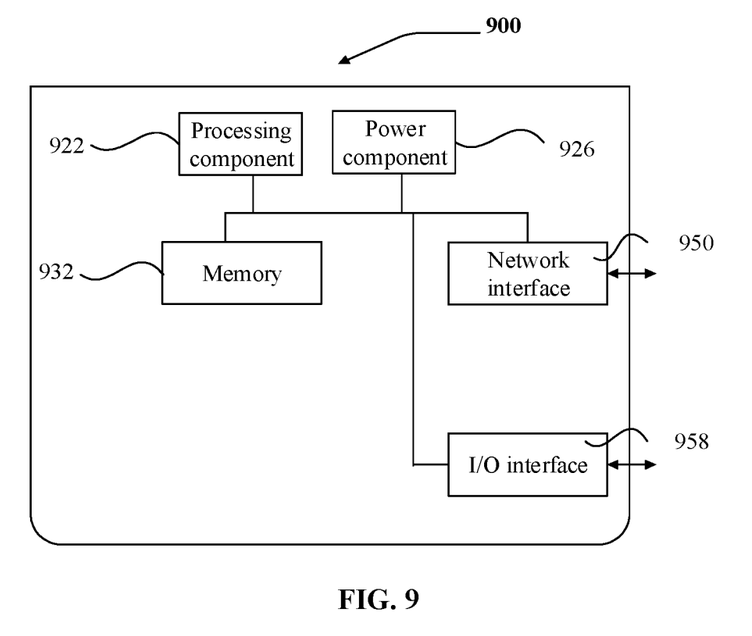
FIG. 9 is a block diagram of a server according to an example.

FIG. 9 is a block diagram of a server 900 according to an example. Referring to FIG. 9, the server 900 includes a processing component 922, and further includes one or more processors, and a memory resource represented by a memory 932 and configured to store an instruction that may be executed by the processing component 922, such as an application program. The application program stored in the memory 932 may include one or more modules, with each module corresponding to one group of instructions. In addition, the processing component 922 is configured to execute the instruction to execute the above information processing method.

The server 900 may further include a power component 926, configured to execute power management of the device 900, a wired or wireless network interface 950 configured to connect the device 900 to the network, and an Input/Output (I/O) interface 958. The device 900 may operate an operation system stored in the memory 932, for example, Android, iOS, Windows Server™, Mac OS X™, Unix™, Linux™, FreeBSD™ and so on.

In an example, a non-temporary computer readable storage medium including an instruction is further provided, for example, the memory 932 including the instruction; and the instruction may be executed by the processing component 922 of the server 900 to complete the above method. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

A non-temporary computer-readable storage medium is provided, which stores instructions that, when executed by a processor of a server, cause the server to execute a method including:

receiving a user event to be processed;
storing the user event to be processed into an event queue corresponding to an event attribute of the user event to be processed. User events with different event attributes correspond to different event queues;
reading the user event from the event queue through multiple processes and processing the user event; and
deleting the processed user event from the event queue.

In some examples, the method may further include:
determining a priority of the user event in a same event queue; and
adjusting a position of the user event in the same event queue according to the priority.

The user event enters the event queue from a tail of the event queue, and is taken out by the multiple processes from a head of the event queue.

In some examples, the determining the priority of the user event in the same event queue may include:
acquiring time information of the user event in the same event queue; and
determining the priority of the user event in the same event queue based on time corresponding to the time information, wherein the priority is positively correlated with the time corresponding to the time information of the user event.

In some examples, the reading the user event from the event queue through the multiple processes and processing the user event may include:
reading the user event from a head of an event queue through one process in the multiple processes, and determining whether trigger time for reading the user event is reached; and
processing the read user event when the trigger time for reading the user event is reached.

In some examples, the reading the user event from the event queue through the multiple processes and processing the user event may include:
reading the user event from different event queues in a polling mode through the multiple processes and processing the user event.

In some examples, the method may further include:
randomly sorting the different event queues.

The reading the user event from the different event queues in the polling mode through the multiple processes and processing the user event comprises:
reading the user event from the randomly sorted different event queues in the polling mode through the multiple processes and processing the user event.

In some examples, the event attribute may include a user identifier indicating a user to which the user event belongs; and user events with different user identifiers correspond to different event queues.

In some examples, the storing the user event to be processed into the event queue corresponding to the event attribute of the user event to be processed may include:
processing the user identifier of the user event to be processed through a consistent hashing algorithm to obtain a hash value; and
storing the user event to be processed into the event queue corresponding to the hash value.

In some examples, the reading the user event from the event queue through the multiple processes and processing the user event may include:
reading, in a script call mode, the user event from the event queue through the multiple processes and processing the user event.

In some examples, the method may further include:
adding one or more event queues when a capacity expansion condition is met.

In some examples, the method may further include:
forbidding storing the user event into one or more event queues when a capacity reduction condition is met; and
deleting the event queue in response to the user event in the event queue being processed.

In the examples of the present disclosure, based on a distributed processing architecture, user events with different event attributes are stored into different event queues, and the user events are read from the event queues through multiple processes and then are processed, i.e., a distributed storage and distributed processing mode is used. On one hand, the user events are dispersed to different event queues through the distributed storage, therefore, compared with a mode in which all user events are stored in an event queue, the operations (reading, sorting and the like) for the user events in each event queue can improve the speed of operating the user events. In addition, when an event queue is abnormal, the user events in rest event queues can still be operated, i.e., the abnormal scheduling of the whole user events caused by a single-point fault of data can be reduced. On the other hand, with the distributed processing, i.e., different user events are processed through multiple processes, the scheduling speed for each user event can be improved, and when one process is damaged, rest processes can still process the user events.

It may be understood that in combination with the distributed storage and the distributed processing, the present disclosure can improve the speed of processing a user event, and can further improve the stability of a server platform.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the present disclosure will be apparent to those skilled in the art from consideration of the specification and practice of the present disclosure disclosed here. This present disclosure is intended to cover any variations, uses, or adaptations of the present disclosure following the general principles of the present disclosure and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof.

What is claimed is:

1. A method for data processing, comprising:
   receiving a user event to be processed;
   storing the user event to be processed into an event queue corresponding to an event attribute of the user event to be processed, wherein user events with different event attributes correspond to different event queues;
   reading the user event from the event queue through multiple processes and processing the user event; and
   deleting the processed user event from the event queue,
   wherein reading the user event from the event queue through the multiple processes and processing the user event comprises:
     reading the user event from a head of an event queue through one process in the multiple processes, and determining, through the one process, whether trigger time for reading the user event is reached; and processing, through the one process, the read user event when the trigger time for reading the user event is reached; or
     reading the user event from different event queues in a polling mode through the multiple processes and processing the user event, comprising:
       randomly sorting the different event queues, and reading the user event from the randomly sorted different event queues in the polling mode through the multiple processes and processing the user event.

2. The method of claim 1, further comprising:
   determining a priority of the user event in a same event queue; and
   adjusting a position of the user event in the same event queue according to the priority, wherein the user event enters the event queue from a tail of the event queue and is taken out by the multiple processes from a head of the event queue.

3. The method of claim 2, wherein determining the priority of the user event in the same event queue comprises:
   acquiring time information of the user event in the same event queue; and
   determining the priority of the user event in the same event queue based on time corresponding to the time information, wherein the priority is positively correlated with the time corresponding to the time information of the user event.

4. The method of claim 3, wherein determining the priority of the user event in the same event queue based on the time corresponding to the time information comprises:
   sorting, using a jump-table sorting algorithm, priorities of N user events in the same time queue based on time information of each of the N user events, wherein an average time complexity of the jump-table sorting algorithm is not greater than log(N), and N is greater than 1.

5. The method of claim 2, wherein determining the priority of the user event in the same event queue comprises:
   determining the priority of the user event based on an event attribute of the user event.

6. The method of claim 1, wherein the event attribute comprises a user identifier indicating a user to which the user event belongs; and user events with different user identifiers correspond to different event queues.

7. The method of claim 6, wherein storing the user event to be processed into the event queue corresponding to the event attribute of the user event to be processed comprises:
   processing the user identifier of the user event to be processed through a consistent hashing algorithm to obtain a hash value; and
   storing the user event to be processed into the event queue corresponding to the hash value.

8. The method of claim 1, further comprising:
   adding one or more event queues when a capacity expansion condition is met; or
   forbidding storing the user event into one or more event queues when a capacity reduction condition is met, and deleting the event queue in response to the user event in the event queue being processed.

9. The method of claim 1, wherein storing the user event to be processed into the event queue corresponding to the event attribute of the user event to be processed comprises:
   during storing the user event to be processed into the event queue, backing up the user event based on a Remote Dictionary Server (Redis) database.

10. An apparatus for data processing, comprising:
    a network interface, configured to receive a user event to be processed;
    a memory, configured to store the user event to be processed into an event queue corresponding to an event attribute of the user event to be processed, wherein user events with different event attributes correspond to different event queues; and
    a processing component, connected to the network interface and the memory, configured to read the user event from the event queue through multiple processes and process the user event; and delete the processed user event from the event queue,
    wherein the processing component is configured to:
      read the user event from a head of an event queue through one process in the multiple processes, and determine, through the one process, whether trigger time for reading the user event is reached; and process, through the one process, the read user event when the trigger time for reading the user event is reached; or read the user event from different event queues in a polling mode through the multiple processes and process the user event, by:

randomly sorting the different event queues; and reading the user event from the randomly sorted different event queues in the polling mode through the multiple processes and processing the user event.

11. The apparatus of claim 10, wherein the processor is further configured to:

determine a priority of the user event in a same event queue; and adjust a position of the user event in the same event queue according to the priority, and wherein the user event enters the event queue from a tail of the event queue and is taken out by the multiple processes from a head of the event queue.

12. The apparatus of claim 11, wherein the processing component is configured to: acquire time information of the user event in the same event queue; and determine the priority of the user event in the same event queue based on time corresponding to the time information, wherein the priority is positively correlated with the time corresponding to the time information of the user event.

13. The apparatus of claim 12, wherein the processing component is further configured to:

sort, using a jump-table sorting algorithm, priorities of N user events in the same time queue based on time information of each of the N user events, wherein an average time complexity of the jump-table sorting algorithm is not greater than log(N), and N is greater than 1.

14. The apparatus of claim 11, wherein the processing component is further configured to:

determine the priority of the user event based on an event attribute of the user event.

15. The apparatus of claim 10, wherein the event attribute comprises a user identifier indicating a user to which the user event belongs; and user events with different user identifiers correspond to different event queues.

16. The apparatus of claim 15, wherein the memory is configured to process the user identifier of the user event to be processed through a consistent hashing algorithm to obtain a hash value; and store the user event to be processed into the event queue corresponding to the hash value.

17. The apparatus of claim 10, wherein the memory is further configured to:

during storing the user event to be processed into the event queue, back up the user event based on a Remote Dictionary Server (Redis) database.

18. A non-transitory computer-readable storage medium, storing instructions that, when executed by a processor of a server, cause the server to implement:

receiving a user event to be processed;

storing the user event to be processed into an event queue corresponding to an event attribute of the user event to be processed, wherein user events with different event attributes correspond to different event queues;

reading the user event from the event queue through multiple processes and processing the user event; and deleting the processed user event from the event queue, wherein reading the user event from the event queue through the multiple processes and processing the user event comprises:

reading the user event from a head of an event queue through one process in the multiple processes, and determining, through the one process, whether trigger time for reading the user event is reached; and processing, through the one process, the read user event when the trigger time for reading the user event is reached; or reading the user event from different event queues in a polling mode through the multiple processes and processing the user event, comprising:

randomly sorting the different event queues, and reading the user event from the randomly sorted different event queues in the polling mode through the multiple processes and processing the user event.

* * * * *